United States Patent [19]

Fauran et al.

[11] 3,862,177
[45] Jan. 21, 1975

[54] NOVEL 1-(2'-BENZOYL ETH-1'-YL)-2-(4''-CINNAMYL PIPERAZIN-1''-YL METHYL) BENZIMIDAZOLES, THEIR PROCESS OF PREPARATION AND THEIR THERAPEUTIC APPLICATION

[75] Inventors: Claude P. Fauran, Paris; Jeannine A. Eberle, Chatou; Albert-Yves Le Cloarec, Saint-Maur; Nicole A. M. Dorme; Guy M. Raynaud, both of Paris, all of France

[73] Assignee: Delalande S. A., Courbevoie (Hauts de Seine), France

[22] Filed: July 2, 1973

[21] Appl. No.: 376,135

[30] Foreign Application Priority Data
July 6, 1972   France .............................. 72.24544

[52] U.S. Cl............ 260/240 K, 424/250, 260/293.8
[51] Int. Cl............................................. C07d 49/38
[58] Field of Search ........... 260/240 J, 309.2, 240 K

[56] References Cited
UNITED STATES PATENTS
3,362,956   1/1968   Archer........................... 260/240 K

OTHER PUBLICATIONS

Chemical Abstracts, Vol. 72, Abst. No. 111506a (1970) (Abst. of German Offen. 1,933,179 published Feb. 5, 1970).

Primary Examiner—John D. Randolph
Attorney, Agent, or Firm—Woodhams, Blanchard and Flynn

[57] ABSTRACT

Compounds of the formula

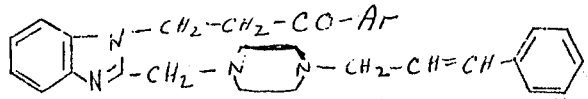

in which Ar is phenyl optionally substituted by a halogen atom, by one or two methyl groups or by 1–4 carbon alkoxy groups are provided as novel therapeutic agents which have inter alia analgesic, vasodilatory, hypotensive, anticholinergic, spasmolytic, atropinic, gastric antisecretory, anti-ulcerous and diuretic properties.

6 Claims, No Drawings

NOVEL 1-(2'-BENZOYL ETH-1'-YL)-2-(4"-CINNAMYL PIPERAZIN-1"-YL METHYL) BENZIMIDAZOLES, THEIR PROCESS OF PREPARATION AND THEIR THERAPEUTIC APPLICATION

The present invention relates to novel 1-(2'-benzoyl eth-1'-yl)-2-(4"-cinnamyl piperazin-1"-yl methyl) benzimidazoles, their process of preparation and their therapeutic application.

The novel compounds in accordance with the present invention corresponds to the general formula:

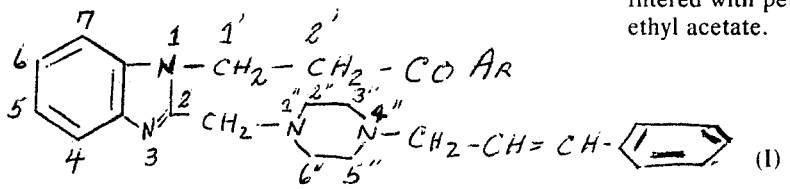

in which Ar represents a phenyl radical optionally substituted
- by a halogen atom,
- by one or two methyl groups, or
- by one or more alkoxy groups containing up to 4 carbon atoms.

The process of preparation of the compounds in accordance with the present invention consists in condensing, in a hydroalcoholic medium, 2-(4'-cinnamyl piperazin-1'-yl methyl) benzimidazole of formula:

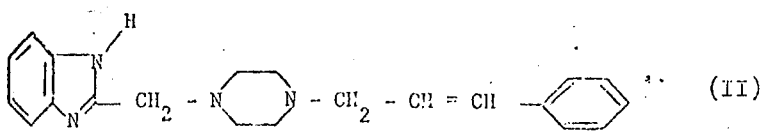

with the hydrochloride of a piperidinomethyl acetophenone, optionally substituted in the benzene ring, of formula:

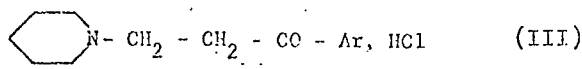

wherein Ar is as defined above, with the elimination of piperidine hydrochloride.

The 2-(4'-cinnamyl piperazin-1'-yl methyl) benzimidazole of formula (II) is prepared by condensing 2-chloromethyl benzimidazole with cinnamylpiperazine.

The following preparation is given by way of example to illustrate the invention.

EXAMPLE 1-(2'-benzoyl eth-1'-yl)-2-(4"-cinnamyl piperazin-1"-yl methyl) benzimidazole.

Code No: 7110

A mixture comprising 0.4 mol of 2-(4'-cinnamyl piperazin-1'-yl methyl) benzimidazole, 0.4 mol of piperidinomethyl acetophenone hydrochloride, 400 ml of ethanol and 400 ml of water, is maintained under reflux for 7½ hours. The precipitate formed is filtered, washed with water and then with ether. The precipitate formed is recrystallised from ethyl acetate, washed and filtered with petrol ether and recrystallised again from ethyl acetate.

Melting point = 123°C
Yield = 61%
Empirical formula = $C_{30} H_{32} N_4 O$
Elementary analysis:

|  |  | C | H | N |
|---|---|---|---|---|
| Calculated | % | 77.55 | 6.94 | 12.06 |
| Found | % | 77.41 | 7.15 | 12.28 |

1-(2'-benzoyl eth-1'-yl)-2-(4"-cinnamyl piperazin-1"-yl methyl) benzimidazole dimaleate.

By the addition of an ethanolic solution of 0.1 mol of maleic acid to an ethanolic solution of 0.05 mol of the base obtained above, the corresponding dimaleate is precipitated, which is then filtered and washed with ether.

Melting point = 177°C
Yield = 90%
Empirical formula = $C_{30} H_{32} N_4 O, 2C_4 H_4 O_4$
Elementary analysis:

|  |  | C | H | N |
|---|---|---|---|---|
| Calculated | % | 65.50 | 5.79 | 8.04 |
| Found | % | 65.59 | 5.85 | 8.22 |

The compounds listed in the following Table I have been prepared according to the same method of operation.

TABLE I

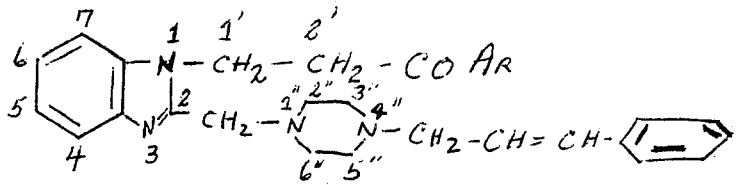

| Code No. | Ar | Form | Empirical formula | Molecular weight | Melting point | Yield | Elementary analysis Calculated % | | | Found % | | |
|---|---|---|---|---|---|---|---|---|---|---|---|---|
|  |  |  |  |  |  |  | C | H | N | C | H | N |
| 7223 | -C₆H₄-Cl | base | $C_{30}H_{31}Cl N_4O$ | 499.04 | 146°C | 45 % | 72.20 | 6.26 | 11.23 | 72.85 | 6.24 | 11.08 |
|  |  | dimaleate | $C_{38}H_{39}Cl N_4O_9$ | 731.13 | 158°C | 96 % | 62.42 | 5.38 |  | 62.34 | 5.50 |  |
| 7223 | -C₆H₄-F | base | $C_{30}H_{31}F N_4O$ | 482.58 | 136°C | 21 % | 74.66 | 6.48 | 11.61 | 74.57 | 6.29 | 11.45 |
|  |  | dimaleate | $C_{38}H_{39}F N_4O_9$ | 714.72 | 145°C | 95 % | 63.85 | 5.50 | 7.84 | 63.92 | 5.46 | 7.64 |

TABLE I—Continued

| Code | R | Form | Formula | MW | MP | Yield | C calc | H calc | N calc | C found | H found | N found |
|---|---|---|---|---|---|---|---|---|---|---|---|---|
| 7231 | -C₆H₄-CH₃ | base | C₃₁H₅₄N₄O | 478.61 | 127°C | 52 % | 77.79 | 7.16 | 11.71 | 78.00 | 7.11 | 11.52 |
| | | dimaleate | C₃₉H₄₂N₄O₉ | 710.76 | 172°C | 98 % | 65.90 | 5.96 | 7.88 | 65.59 | 5.68 | 7.76 |
| 7227 | -C₆H₃(CH₃)₂ | base | C₃₂H₃₆N₄O | 492.64 | 93°C | 37 % | 78.01 | 7.37 | 11.37 | 77.84 | 7.19 | 11.24 |
| | | dimaleate | C₄₀H₄₄N₄O₉ | 724.78 | 137°C | 51 % | 66.28 | 6.12 | 7.73 | 66.03 | 6.32 | 7.53 |
| 71399 | -C₆H₄-OCH₃ | base | C₃₂H₃₆N₄O₃ | 524.64 | 137°C | 43 % | 73.25 | 6.92 | 10.68 | 73.45 | 6.87 | 10.67 |
| | | dimaleate | C₄₀H₄₄N₄O₁₁ | 756.78 | 122°C | 51 % | 63.48 | 5.86 | 7.40 | 63.38 | 5.88 | 7.32 |
| 71376 | -C₆H₃(OCH₃)₂ | base | C₃₃H₃₈N₄O₄ | 554.66 | 131°C | 48 % | 71.45 | 6.91 | 10.09 | 71.47 | 6.99 | 10.25 |
| | | dimaleate | C₄₁H₄₆N₄O₁₂ | 786.81 | 175°C | 98 % | 62.58 | 5.89 | 7.12 | 62.41 | 5.75 | 6.93 |
| 7232 | -C₆H₄-CC₄H₉(n) | base | C₃₄H₄₀N₄O₂ | 536.69 | 109,5°C | 50 % | 76.08 | 7.51 | 10.44 | 76.09 | 7.41 | 10.32 |
| | | dimaleate | C₄₂H₄₈N₄O₁₀ | 768.84 | 150°C | 88 % | 65.65 | 6.29 | 7.29 | 65.72 | 6.02 | 7.16 |

The compounds of formula (I) have been tested on animals in the laboratory and have been shown to possess analgesic, vasodilatatory, hypotensive, anticholinergic, spasmolytic, atropinic, gastric antisecretory, anti-ulcerous and diuretic properties.

1. Analgesic properties

The compounds of formula (I), administered by oral means to the mouse, are capable of reducing the number of painful stretchings caused by the intraperitoneal injection of acetic acid.

By way of example, the results obtained with different compounds of formula (I) are listed in the following Table II.

TABLE II

| Code No. of Compound tested | Dose administered (mg/kg/PO) | Percentage reduction in number of painful stretchings |
|---|---|---|
| 7110 | 100 | 85 |
| 71399 | 50 | 50 |
| 71376 | 100 | 40 |

2. Vasodilatatory properties

The compounds of formula (I) are capable of augmenting the flow of the coronary vessels of the isolated heart of a guinea-pig, when said compounds are added to the perfusion liquid of said organ.

By way of example, upon adding to the perfusion liquid of the isolated heart of a guinea-pig, the compound of Code No. 7110 in a concentration of 2.5 $\mu$g/ml, the flow of said organ is augmented by 80%.

3. Hypertensive properties

Administered by intraveinous means to the anaesthetised rat, the compounds of formula (I) cause a lowering of the arterial pressure.

By way of example, the administration by intraveinous means of 2 mg/kg of the compound of Code No. 7231, cause a reduction of the arterial pressure of about 60% for 30 minutes.

4. Anticholinergic properties

Injected by intraveinous means, the compounds of formula (I) are capable of opposing the bronchoconstriction provoked in the guinea-pig by the intraveinous injection of acetylcholine and evaluated by the Konzett method.

By way of example, the results obtained by the administration of different compounds of formula (I) are given in the following Table III.

TABLE III

| Code No. of Compound tested | Dose administered (mg/kg/IV) | Percentage inhibition of bronchoconstriction (%) |
|---|---|---|
| 7231 | 0.5 | 100 |
| 7232 | 2.5 | 100 |
| 71376 | 5 | 100 |

5. Spasmolytic properties

The compounds of formula (I), introduced in the conserving medium are capable of opposing the contractural action of barium chloride on the isolated duodenum of the rat.

By way of example, the spasmolytic activity of the compounds of Code Nos. 7231 and 71399, expressed by their DE 50, is 2.5 $\mu$g/ml and 3 $\mu$g/ml respectively.

6. Atropinic properties

The compounds of formula (I), introduced in the conserving medium, are capable of opposing the contractural action of acetylcholine on the isolated duodenum of the rat.

By way of example, the atropinic activity of the compound of Code No. 7231, expressed by its DE 50, is 0.005 $\mu$g/ml.

7. Gastric antisecretory properties

The compounds of formula (I), administered by intraduodenal means to the anaesthetised rat provided with a tied pylorus are capable of diminishing the volume of gastric secretion.

By way of example, the results obtained, with different compounds of formula (I), are given in the following Table IV, and compared in Table V with those obtained with the methyl sulphate of diphemanil (PRANTAL):

TABLE IV

| Code No. of Compound Tested | Dose administered (mg/kg/ID) | Percentage reduction of gastric secretion |
|---|---|---|
| 7110 | 1 | 55 |
| 7223 | 25 | 60 |
| 7231 | 25 | 45 |
| 71399 | 50 | 32 |

TABLE V

| Code No. of Compound tested | Toxicity (mg/kd/ID) | DE 50 (mg/kg/ID) | DE 50 DL 50 |
|---|---|---|---|
| 71110 | DL 50 : 1700 | ≅1 | 0.0006 |
| 7223 | DL 0 : 2000 | <25 | <0.013 |
| 7231 | DL 20 : 2000 | >>50 | |
| PRANTAL | DL 50 : 317 | 50 | 0.15 |

It can be seen from Table V that PRANTAL is clearly less active than the compound of Code No. 7110, and less active than the compounds of Code Nos. 7231 and 7223.

8. Anti-ulcerous properties a. Reserpine ulcers: the compounds of formula (I) reduce the gastric ulcers caused by the intraperitoneal injection of reserpine.

By way of example, the DE 50 of the compound of Code No. 7110 is 7 mg/kg/PO, and the results obtained by the administration of other compounds of formula (I) are given in the following Table VI:

TABLE VI

| Code No. of Compound tested | Dose administered (mg/kg/PO) | Percentage reduction of ulcers |
|---|---|---|
| 7223 | 100 | 85 |
| 7231 | 100 | 60 | b. Constraint ulcers: the compounds of formula (I), administered by oral means, reduce the surface of the ulcerations provoked in a rat placed under constraint for 18 hours.

By way of example, the DE 50 of the compound of Code No. 7110 is 10 mg/kg, and the results obtained by the administration of other compounds of formula (I) are given in the following Table VII:

TABLE VII

| Code No. of compound tested | Dose administered (mg/kg/PO) | Percentage reduction of constraint ulcers |
|---|---|---|
| 7232 | 100 | 45 |
| 71399 | 100 | 95 | c. Shay ulcers: the compounds of formula (I), administered by intraduodenal means, reduce the extent of gastric ulcers provoked in a rat by tying of the pylorus.

By way of example, the DE 50 of the compound of Code No. 7110 is 10 mg/kg and the results obtained by the administration of other compounds of formula (I) are given in the following Table VIII.

TABLE VIII

| Code No. of Compound tested | Dose administered (mg/kg/ID) | Percentage reduction of Shay ulcers |
|---|---|---|
| 7231 | 50 | 100 |
| 71399 | 50 | 60 |

9. Diuretic properties

The compounds of formula (I), administered by oral means to the mouse simultaneously with a volume of 1 ml of an isotonic solution of sodium chloride per 25g. of the corporeal weight of the mouse, are capable of provoking an augmentation of the volume of urine emitted by reference to control animals, the volume being measureed for 4 hours following administration.

By way of example, the administration of 20 mg/kg/PO of the compound of Code No. 7231 augments the urinary elimination by 65%.

As can be seen by comparison of the results expressed above and the values shown in the following Table IX, the difference between the pharmacologically-active dose and the lethal dose is sufficiently great to permit the compounds of formula (I) to be utilized in therapeutics.

TABLE IX

| Code No. of compound tested | Dose administered (mg/kg/PO) | Percentage mortality |
|---|---|---|
| 7110 | 1700 | ≃50 |
| 7223 | 2000 | 0 |
| 7231 | 2000 | 20 |
| 7232 | 2000 | 0 |
| 71399 | 2000 | 10 |
| 71376 | 2000 | 0 |

The compounds of formula (I) are useful in the treatment of various pains, circulatory insufficiencies, hypertensions, visceral spasms, gastro-duodenal ulcers and oedemas.

They may be administered by oral means in the form of tablets, dragees and gelules containing 1 to 300 mg of active ingredient (1 to 5 times a day).

Accordingly, the present invention relates to a therapeutic composition comprising a compound of the general formula (I) together with a therapeutically-acceptable carrier.

What we claim is:

1. A compound of the formula

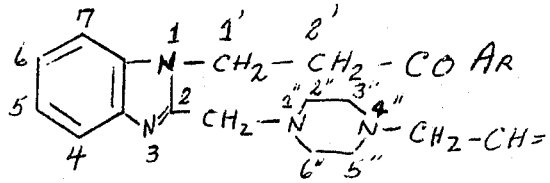

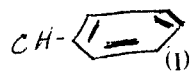

in which Ar represents a phenyl radical optionally substituted:
- by a halogen atom,
- by one or two methyl groups, or
- by one or more alkoxy groups containing up to 4 carbon atoms.

2. A compound as claimed in claim 1, in which Ar represents a phenyl radical.

3. A compound as claimed in claim 1, in which Ar represents a p - chlorophenyl or a p -fluorophenyl radical.

4. A compound as claimed in claim 1, in which Ar represents a p-tolyl radical or a 2,4-dimethylphenyl radical.

5. A compound as claimed in claim 1, in which Ar represents a 2,4-dimethoxyphenyl, a 3,4,5-trimethoxyphenyl or a n-butoxyphenyl radical.

6. A process for the preparation of a compound as claimed in claim 1 comprising condensing, in a hydroalcoholic medium 2-(4'-cinnamyl piperazin-1'-yl methyl) benzimidazole of formula:

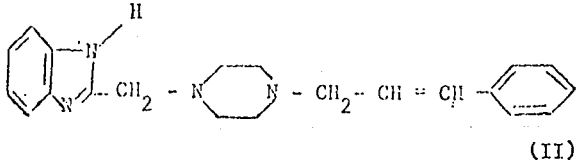

with the hydrochloride of a piperidinomethyl acetophenone optionally substituted in the phenyl ring of formula:

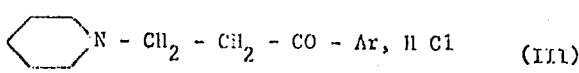

with the elimination of piperidine hydrochloride.

* * * * *